UNITED STATES PATENT OFFICE.

JAMES BUDD, OF BOSTON, MASSACHUSETTS, ASSIGNOR, BY DIRECT AND MESNE ASSIGNMENTS, TO THE GLASS VENEER COMPANY, OF MAINE.

ORNAMENTAL GLASS TO IMITATE WOOD.

SPECIFICATION forming part of Letters Patent No. 251,692, dated January 3, 1882.

Application filed May 24, 1881. (Specimens.)

*To all whom it may concern:*

Be it known that I, JAMES BUDD, of Boston, in the county of Suffolk and State of Massachusetts, have invented a new and useful Improvement in Ornamental Glass to Imitate Wood, of which the following is a specification.

My invention relates to a new and improved means of producing ornamental glass, either semi-transparent or opaque, and representing highly-polished woods of all varieties, and which shall be applicable for veneering, and also for vestibule and other doors, the exterior surface having the appearance of highly-polished woods, while from the interior the glass will be semi-transparent, softening the light in the halls, &c., and obviating the necessity of shades, as required when embossed glass is used, producing a much finer effect at a very much less expense.

In carrying out my invention I take a sheet of ground glass of any required size, and cloud the same on one side with a liquid dye of the proper color to represent any desired wood, the liquid being made adhesive. A sponge is used in delineating the grain of the wood upon the surface of the glass, the shading being softened by a badger-brush, and then flowing on photographer's varnish, which leaves the grain clear and fast, without the necessity of using any gelatinous substances, which are liable to crack and spoil the effect. To complete the operation the glass is then slightly heated, and the various shades of dyes required for the wood to be represented are flowed over by means of a syringe. The glass is heated in order that the dyes may dry quickly and prevent the shadings from dissolving into each other. The whole is then made semi-transparent from the interior by applying another coating of the photographer's varnish, while the exterior presents the appearance of a highly-polished solid-wood finish.

In making the glass opaque, to be used as a veneer, I employ the same process as above described, with the addition of a backing consisting in coating the dyed veneer with shellac, in which, before it is dry, is rubbed dry powdered plaster-of-paris or Portland cement with various dry colors, by means of cork, thus making a hard porcelain backing. The backing of the opaque veneer is necessary to prevent sweating when used in furniture, walls, &c.

My invention is applicable for very general use as a substitute for varnished and polished woods; as a veneer in the finish of all kinds of cabinet-work, furniture, &c.; in the walls of houses, and in the finish of railroad-cars and vessels' cabins.

As no paint or any oily substances are used in my process, there is no liability of peeling from the glass by age or exposure to the atmosphere or to heat.

What I claim as my invention is—

1. The herein-described process for ornamenting glass, which consists in applying to the same a liquid dye to represent any desired wood, then applying photographer's varnish, and afterward heating the glass before applying various shades of dyes in representation of the shades of the respective woods imitated, shellac combined with dry plaster-of-paris and suitable dry colors being then applied to form a background to bring out the proper effect, and at the same time serve as a backing, as and for the purpose specified.

2. As a new article of manufacture, sheets of glass ornamented to represent highly-polished woods by applying to the same liquid dyes of the proper color to represent any desired wood and covering the same with photographer's varnish, to which, after heating, is applied a backing of shellac, into which is rubbed powdered plaster-of-paris with various dry colors, substantially as specified.

In testimony whereof I have signed my name to this specification in the presence of two subscribing witnesses.

JAMES BUDD.

Witnesses:
 JOS. H. ADAMS,
 B. O'HARA.